O. C. KNIPE.
BALL BEARING.
APPLICATION FILED OCT. 31, 1912.

1,134,463.

Patented Apr. 6, 1915.

WITNESSES

INVENTOR
Oliver C. Knipe
by Robert Lea
Attorney

UNITED STATES PATENT OFFICE.

OLIVER C. KNIPE, OF PALO ALTO, CALIFORNIA.

BALL-BEARING.

1,134,463.   Specification of Letters Patent.   Patented Apr. 6, 1915.

Application filed October 31, 1912. Serial No. 728,861.

*To all whom it may concern:*

Be it known that I, OLIVER C. KNIPE, a citizen of the United States, and resident of Palo Alto, in the county of Santa Clara and State of California, have invented new and useful Improvements in Ball-Bearings, of which the following is a specification.

This invention relates to ball bearings and comprises an improved construction by which the balls may be maintained uniformly spaced to equally distribute the thrust and maintain lateral or end pressure uniform on the several balls, to prevent distortion of the spacer-ring or floating separator by holding it central within the bearing, and to utilize the separator for the purpose of holding the several parts of the bearing together so that the device may be handled as a unit.

As commonly constructed the spacing devices of ball bearings are supported only on the balls and are free to assume any angle relatively to the shaft depending on the amount of wear and the looseness of its fit, so that after a period of hard service the wear on the soft edges of the spacer-ring permits it to tilt relatively to the shaft and become deformed by engaging the walls of the raceway. In my construction the spacer is at all times held truly concentric with the central axis of the bearing and is guided in that relation by bearing against an annular wall of the raceway, therefore it receives uniform wear by the rubbing action of the balls against its prongs or tines and there is no possibility of tilting or deformation; moreover the spacer by being connected to and embracing loosely the two members which provide the ball-race constitutes an interlocking device which makes a single unit for purposes of handling the several elements of the ball bearing, thus facilitating shipment and mounting. I attain these desirable results by providing the spacer with circular edges which engage by an easy fit circular walls of the raceway.

My invention therefore comprises a ball bearing having a raceway for the balls, and a floating spacer engaging the several balls to hold them mutually equidistant, and a concentric guide to hold it in uniform relation to the shaft or axis of rotation.

It comprises, moreover, a ball spacer interlocking with the two members which form the raceway, as the ball cup and cone or other coöperating member.

The several features of novelty will be hereinafter more fully described and will be definitely pointed out in the claims.

Figure 1:
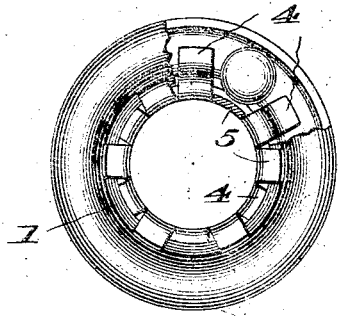
Figure 2:
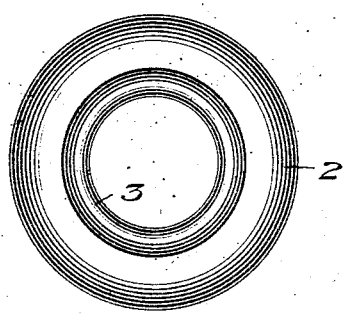
Figure 3:
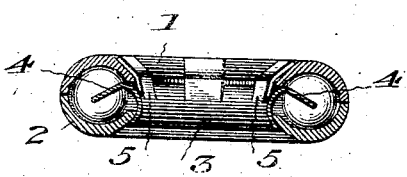
Figure 4:
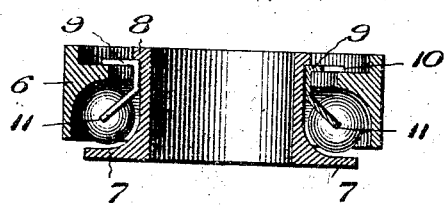
Figure 5:
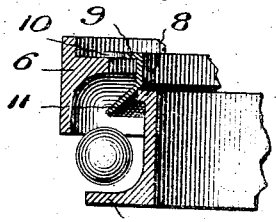
Figure 6:
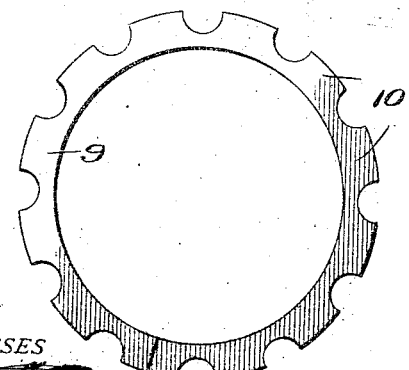
Figure 7:
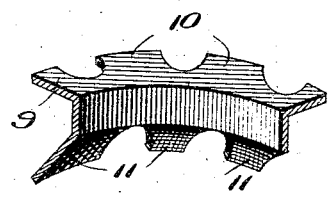

In the accompanying drawings which illustrate the invention Figures 1 and 2 show in broken side elevation and plan, respectively, a form of thrust bearing embodying my invention. Fig. 3 is a central section of the form shown in Figs. 1 and 2. Fig. 4 is a modification adapted either for end-thrust or weight, the device being shown in median central section. Fig. 5 illustrates the mode of assembling the form shown in Fig. 4. Figs. 6 and 7 are detail views illustrating the spacer-ring of Fig. 4.

Referring first to Figs. 1 to 3. 1 and 2 are stampings of sheet steel adapted to form a raceway for a series of balls, being cupped to almost entirely inclose the balls, leaving only a narrow space between their confronting edges so that when mounted with the lower cup bearing on a fixed base and the upper one secured to the shaft, the entire weight will be supported on the balls. The balls are spaced uniformly by a steel spacer 3 having tines 4 which extend into the raceway to a point about even with the center of the balls. The spacer may be formed from a short ring of steel punched or slitted with a plurality of equidistant cuts so as to form a plurality of teeth 4, 5 the alternate leaves of which are flanged outward at an angle as seen in Figs. 1 and 3 to interleave with the balls. The ball bearing is assembled by placing the parts on a support in a press or flanging tool, introducing the desired number of balls, and placing the spacer-ring in position with its alternate tines between the balls. A pair of flanging dies or the dies of the press are then brought together to simultaneously curl the tines over the upper ball cup and to expand the uncut part of the spacer so as to loosely embrace the inner edge of the lower cup. The thrust bearing is thus completed. The flaring tools are adjusted so that the curved edges of the spacer do not form a tight fit but are separated from the walls of the cups by a slight clearance, just enough to permit freedom of motion. The steel cups are of course hardened and polished before assembly.

In the form shown in Figs. 4 to 7 the parts of the raceway are made of tool steel. The cup is formed into a ball receptacle and the cone 7 provided with a shoulder. The floating spacer is a split ring of sheet steel provided with a right angled flange 10 and an angular flange 11, each indented to form a plurality of tines; the indentations give the ring more elasticity and permit it to be expanded in assembling the parts.

The manner of assembly will be clear from Fig. 5. The cup is raised and the balls fed into place. The elastic spacer is placed on top of the cone and a plunger is applied to snap the spacer into place under the rib 8. The cone and cup are thereby interlocked by the spacer and the inner face of the latter is free to turn by an easy fit on the shoulder 8. The tines 11 interlock with the balls, keeping them uniformly spaced. This form of bearing, as will be evident, may be used to take either weight or end-thrust, and may be used in all cases where the end-thrust is not very severe.

Having thus described my invention, what I claim as new and desire to secure by Letters-Patent is:

1. A ball bearing comprising two members each having a circular track for balls, a floating ball-spacer having angular tongues separating the balls from one another and other tongues locking the two members together, and a series of balls between the two members.

2. A ball bearing comprising two members both having a circular track for balls, a floating ball-spacer in close relation consisting of a ring with tongues at each side one set of tongues at an angle to separate the several balls from one another and the other set of tongues at an angle to overlap one of the members and act to lock the members together.

3. A ball bearing comprising an inner and an outer member both flanged at each side, the inner member adapted to pass through the outer member, a ball-spacer consisting of a split ring adapted to be contracted to enter one of the said flanges and having at its sides integral angular tongues, one set of tongues separating the several balls from each other and the other set of tongues overlapping the flange of a member to lock the members together.

OLIVER C. KNIPE.

Witnesses:
S. C. HILL,
ROBT. H. READ.